United States Patent
Shankar et al.

(10) Patent No.: US 10,452,528 B2
(45) Date of Patent: Oct. 22, 2019

(54) SYSTEM AND METHOD FOR ASSISTING A USER IN AN APPLICATION DEVELOPMENT LIFECYCLE

(71) Applicant: HCL Technologies Limited, Noida (IN)

(72) Inventors: Venkatesh Shankar, Chennai (IN); Simy Chacko, Hyderabad (IN)

(73) Assignee: HCL Technologies Limited, Noida, Uttar Pradesh ( * ) Notice: Subject to any disclaimer, the term of this patent is extended or adjusted under 35 U.S.C. 154(b) by 46 days.

(21) Appl. No.: 15/907,161

(22) Filed: Feb. 27, 2018

(65) Prior Publication Data

US 2018/0276110 A1  Sep. 27, 2018

(30) Foreign Application Priority Data

Mar. 22, 2017 (IN) .............................. 201711010066

(51) Int. Cl.
| | |
|---|---|
| *G06F 9/44* | (2018.01) |
| *G06F 11/36* | (2006.01) |
| *G06F 17/21* | (2006.01) |
| *G06F 8/70* | (2018.01) |
| *G06N 20/00* | (2019.01) |
| *G06F 8/71* | (2018.01) |
| *G06F 15/76* | (2006.01) |
| *G06N 5/00* | (2006.01) |

(52) U.S. Cl.
CPC ............ *G06F 11/3692* (2013.01); *G06F 8/70* (2013.01); *G06F 8/71* (2013.01); *G06F 11/3684* (2013.01); *G06F 15/76* (2013.01); *G06F 17/21* (2013.01); *G06N 20/00* (2019.01); *G06N 5/00* (2013.01)

(58) Field of Classification Search
CPC .... G06F 11/3668; G06F 8/10; G06F 11/3692; G06F 8/70; G06N 20/00; G06Q 10/06
See application file for complete search history.

(56) References Cited

U.S. PATENT DOCUMENTS

| | | |
|---|---|---|
| 8,694,966 B2 | 4/2014 | Gupta |
| 9,064,055 B2 | 6/2015 | Hu et al. |
| 9,268,672 B1 | 2/2016 | Gupta |
| 9,519,477 B2 | 12/2016 | Champlin-Scharff et al. |

(Continued)

*Primary Examiner* — Tuan A Vu
(74) *Attorney, Agent, or Firm* — HMLG Law Group LLP; Vani Moodley, Esq.

(57) ABSTRACT

The present disclosure relates to system(s) and method(s) for assisting a user in application development lifecycle. The system is configured to receive a new use case from a user device and identify a sub-set of development solutions from a set of development solutions, stored in a historical data repository, that are applicable for developing code corresponding to the new use case. Furthermore, the system is configured to receive a set test cases corresponding to each development solution from the historical data repository. Furthermore, the system is configured to generate a problem report and a false failure report based on analysis of the set of test cases. The system is further configured to rank the sub-set of development solutions based on analysis of the problem report and the false failure report. Further, the system is configured to generate a decision template based on the ranking of the sub-set of development solutions.

11 Claims, 3 Drawing Sheets

(56) References Cited

U.S. PATENT DOCUMENTS

| | | | | |
|---|---|---|---|---|
| 2008/0313596 | A1* | 12/2008 | Kreamer | G06Q 10/06 |
| | | | | 717/101 |
| 2011/0004499 | A1* | 1/2011 | Zhang | G06F 8/10 |
| | | | | 705/7.37 |
| 2015/0134543 | A1* | 5/2015 | Ivanic | G06N 20/00 |
| | | | | 705/300 |
| 2017/0004065 | A1* | 1/2017 | Angwin | G06F 11/3668 |

* cited by examiner

SYSTEM AND METHOD FOR ASSISTING A USER IN AN APPLICATION DEVELOPMENT LIFECYCLE

CROSS-REFERENCE TO RELATED APPLICATIONS AND PRIORITY

The present application benefit from Indian Complete Patent Application No 201711010066 filed on 22 Mar. 2017, the entirety of which is hereby incorporated by reference.

TECHNICAL FIELD

The present disclosure in general relates to the field of software development. More particularly, the present invention relates to a system and method for assisting a user in an application development lifecycle.

BACKGROUND

A software developer may face multiple issues/bugs while developing a software application. The software developer may spend a lot of time in identifying and fixing these bugs. In order to identify the bugs, the software developer may have to debug all modules associated with the application. Further, the developer may not be able to classify the issues/bugs in the application under development due to lack of background knowledge of the application under development. There are instances at which false failure in the application is detected due to failure of one or more test cases and not the code of the application.

Further, the software developer may be interested in adding a new feature or a new functionality to the application under development. However, the developer may not be aware of issues/bugs that may arise while introducing the new feature into the software application, due to lack of knowledge of similar feature already implemented by other developers in any other application.

SUMMARY

This summary is provided to introduce aspects related to a system and method for assisting a user in an application development lifecycle and the aspects are further described below in the detailed description. This summary is not intended to identify essential features of the claimed subject matter nor is it intended for use in determining or limiting the scope of the claimed subject matter.

In one embodiment, a method for assisting a user in an application development lifecycle is illustrated. The method may comprise receiving, by a processor, a new use case from a user device. The new use case may correspond to a new feature to be incorporated in an application under development. Further to receiving the new use case, the method may comprise identifying, by the processor, a sub-set of development solutions from a set of development solutions stored in a historical data repository. The sub-set of development solutions may be associated with a set of applications and are applicable for developing the new feature. Upon identifying the sub-set of development solutions, the method may comprise receiving, by the processor, a set of test cases corresponding to each development solution, of sub-set of development solutions, from the historical data repository. Once the set of test cases is received, the method may comprise generating, by the processor, a problem report and a false failure report based on analysis of the set of test cases. In one embodiment, the problem report and the false failure report may correspond to each development solution from the sub-set of development solutions. Further, the method may comprise ranking, by the processor, the sub-set of development solutions based on analysis of the problem report and the false failure report, corresponding to each development solution. Finally, the method may comprise generating, by the processor, a decision template based on the ranking of the set of development solutions.

In another embodiment, a system for assisting a user in an application development lifecycle is illustrated. The system comprises a memory and a processor coupled to the memory, further the processor is configured to execute programmed instructions stored in the memory. In one embodiment, the processor may execute programmed instructions stored in the memory for receiving a new use case from a user device. The new use case may correspond to a new feature to be incorporated in an application under development. Further to receiving the new use case, the processor may execute programmed instructions stored in the memory for identifying a sub-set of development solutions from a set of development solutions stored in a historical data repository. The sub-set of development solutions may be associated with a set of applications and are applicable for developing the new feature. Upon identifying the sub-set of development solutions, the processor may execute programmed instructions stored in the memory for receiving a set of test cases corresponding to each development solution, of sub-set of development solutions, from the historical data repository. Once the set of test cases is received, the processor may execute programmed instructions stored in the memory for generating a problem report and a false failure report based on analysis of the set of test cases. In one embodiment, the problem report and the false failure report may correspond to each development solution from the sub-set of development solutions. Further, the processor may execute programmed instructions stored in the memory for ranking the sub-set of development solutions based on analysis of the problem report and the false failure report, corresponding to each development solution. Finally, the processor may execute programmed instructions stored in the memory for generating a decision template based on the ranking of the sub-set of development solutions.

In yet another embodiment, a computer program product having embodied computer program for assisting a user in an application development lifecycle is disclosed. The program may comprise a program code for receiving a new use case from a user device. The use case may correspond to a new feature to be incorporated in an application under development. Further to receiving the use case, the program may comprise a program code for identifying a sub-set of development solutions from a set of development solutions stored in a historical data repository. The sub-set of development solutions may be associated with a set of applications and are applicable for developing the new feature. Upon identifying the sub-set of development solutions, the program may comprise a program code for receiving a set of test cases corresponding to each development solution, of sub-set of development solutions, from the historical data repository. Once the set of test cases is received, the program may comprise a program code for generating a problem report and a false failure report based on analysis of the set of test cases. In one embodiment, the problem report and the false failure report may correspond to each development solution from the sub-set of development solutions. Further, the program may comprise a program code for ranking the sub-set of development solutions based on analysis of the problem report and the false failure report, corresponding to each development solution. Finally, the program may comprise a program code for generating a decision template based on the ranking of the sub-set of development solutions.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "receiving", "identifying", "generating", and "ranking", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods for assisting a user in an application development lifecycle are now described. The disclosed embodiments of the system and method for assisting the user in the application development lifecycle are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for assisting a user in an application development lifecycle is not intended to be limited to the embodiments illustrated, but is to be accorded the widest scope consistent with the principles and features described herein.

The present subject matter relates to a system and method for assisting a user in an application development lifecycle. In one embodiment, a new use case may be received from a user device. Further, one or more target use cases identical to the new use case may be identified. Furthermore, a sub-set of development solution from a set of development solutions corresponding to the one or more target use cases may be identified from the historical data repository. Further a set of test cases corresponding to each development solution from the sub-set of development solutions may be identified from the historical data repository. Further, a set of failures may be determined based on processing of the set of test cases. Further, each failure from the set of failures may be categorized as a problem/bug or a false failure. Furthermore, a decision template may be generated. The decision template may correspond to mapping of the new use case with the sub-set of development solutions based on the categorization of each failure from the set of failures.

Figure 1:
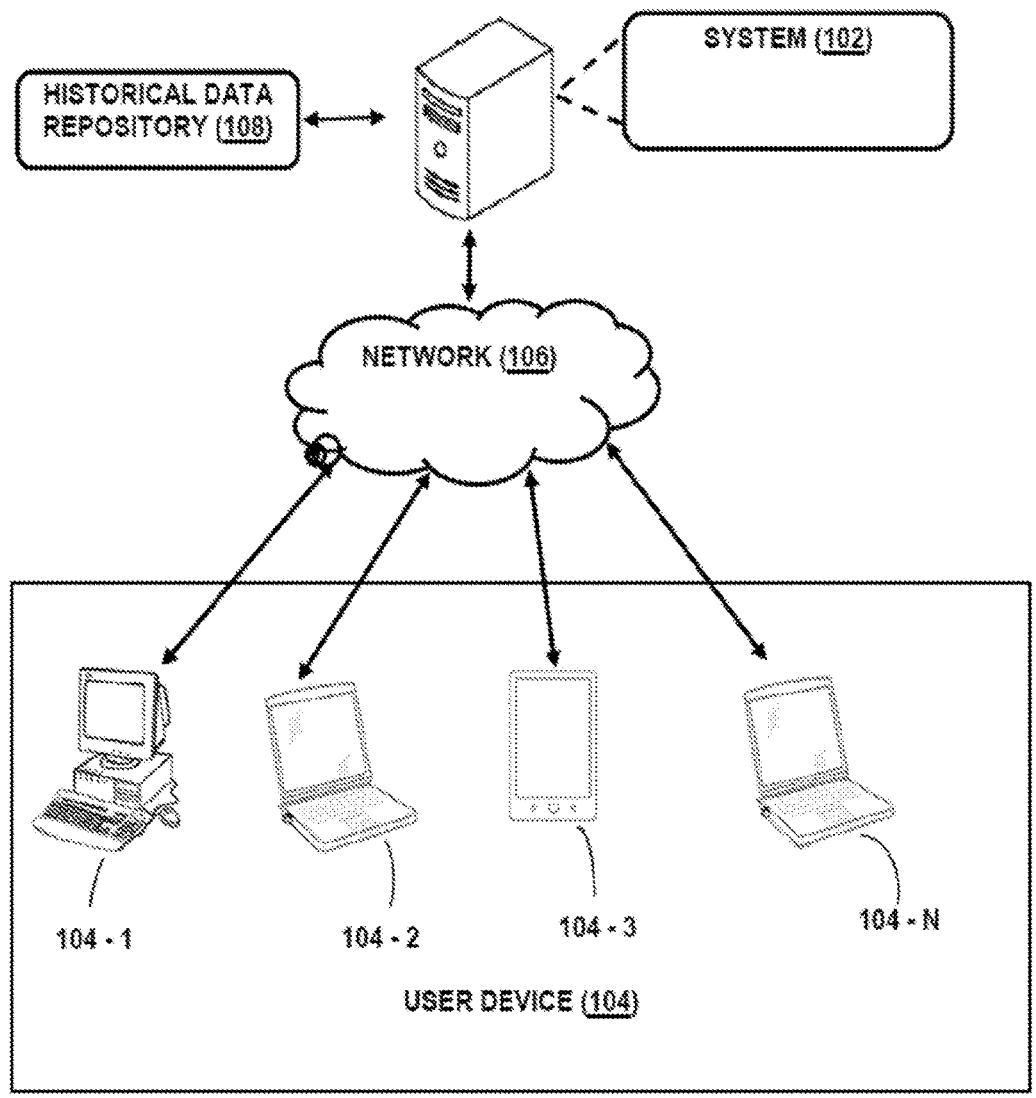
FIG. 1 illustrates a network implementation of a system for assisting a user in an application development lifecycle, in accordance with an embodiment of the present subject matter.

Referring now to FIG. 1, a network implementation 100 of a system 102 for assisting a user in an application development lifecycle is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106. Further, the system 102 may be connected to a historical data repository 108 by a wired or wireless communication channel.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one implementation, the historical data repository 108 may be part of the system 102. In another implementation, the system 102 may access the historical data repository 108 maintained at a remote server (not shown). The historical data repository 108 may also be implemented in a cloud based environment. The historical data repository 108 may be a local repository or a global repository.

In one embodiment, the system 102 may enable a content processor, a map predictor, a use case analyser, a test case processor, a failure categorization processor, a decision template processor and the like. In one embodiment, the system 102 may enable a data importer interface. The data importer interface may be configured to receive data from a set of external data sources. The set of external data sources may comprise a use case management system (Requirement repository), a project management system, a risk management system, resolution document repository system, a test case and scripts repository system, a failure log/debugs file system and the like.

Further, the content processor of the system 102 may process the data received from the set of external data sources and store the processed data in one or more data tables maintained in the historical data repository 108. The content processor may be configured to process data, such as one or more use cases, one or more test cases, one or more failures, one or more resolutions and the like, received from the set of external data sources, and store the processed data in the one or more data tables of the historical data repository 108. The one or more data tables may correspond to use case data table, project management data table, test case data table, failure management data table, resolution document data table and the like. In one embodiment, the historical data repository 108 may be configured to store a set of use cases, a set of development solutions corresponding to each use case from the set of use cases, a set of test cases corresponding to each development solution and the like. Further, the historical data repository 108 may comprise a mapping of use cases from the use case data tables, failures from the failure management data tables, and resolutions from the resolution document data tables. In one example, the mapping may correspond to an existing Use Case-Risk-Resolutions (URR) mapping. Further, the content processor of the system 102 may be configured to generate a model based on the processing of the data received from external data sources.

Furthermore, the map predictor may be configured to analyse the use cases and test cases to determine a predicted Use Case-Risk-Resolutions (URR) mapping. Further, the map predictor may process the model received from the content processor with respect to use cases and test cases, and the like. In one embodiment, text mining algorithm may be used to determine the URR mapping. Further, the map predictor may compare the predicted URR mapping with the existing URR mapping to update the one or more data tables of the historical data repository 108. Furthermore, the predicted URR mappings may correspond to URR mapping predicted by analyser and already exists in the historical data repository 108, URR mapping predicted by the analyser but not existing in the historical data repository 108, URR mapping existing in the historical data repository 108 but not predicted by the analyser, and the like. Further, the predicted URR mappings that already exists in the historical data repository 108 may be marked and stored in the one or more data tables of the historical data repository 108.

Further, the use case analyser may be configured to receive a new use case from the user device 104 via the network 106. Furthermore, the use case analyser may be configured to determine one or more target use cases, similar to the new use case, from the historical data repository 108 based on the processing performed at the content processor.

In one embodiment, the test case/script processor may be configured to identify a sub-set of development solutions from the set of development solutions, from the historical data repository 108, corresponding to the one or more target use cases similar to the new use case. Prior to the identification of the sub-set of development solutions, the test case/script processor may analyse the use cases and the test cases from the historical data repository 108 to determine the relationship between the use cases and the test cases using natural language processing.

Further, the failure categorization processor of the system 102 may identify the set of test cases associated with each development solution from the sub-set of development solutions from the historical data repository 108. Further, the failure categorization processor may process the set of test cases using text mining algorithm and may determine a set of failures and a set of resolutions associated with the set of failures. Further, the failure categorization processor may categorize each failure from the set of failures as a problem or a false failure and generate a problem report and a false failure report. The failure categorization processor may use text mining and machine learning algorithm for categorizing each failure from the set of failures.

Further, the decision templates processor of the system 102 may be configured to generate a decision template. In one embodiment, the decision template may correspond to mapping of the new use case, and the sub-set of development solutions based on the categorization of the set of failures and the predicted Use Case-Risk-Resolutions (URR) mapping. The system 102 for assisting a user in an application development lifecycle is further elaborated with respect to the FIG. 2.

Figure 2:
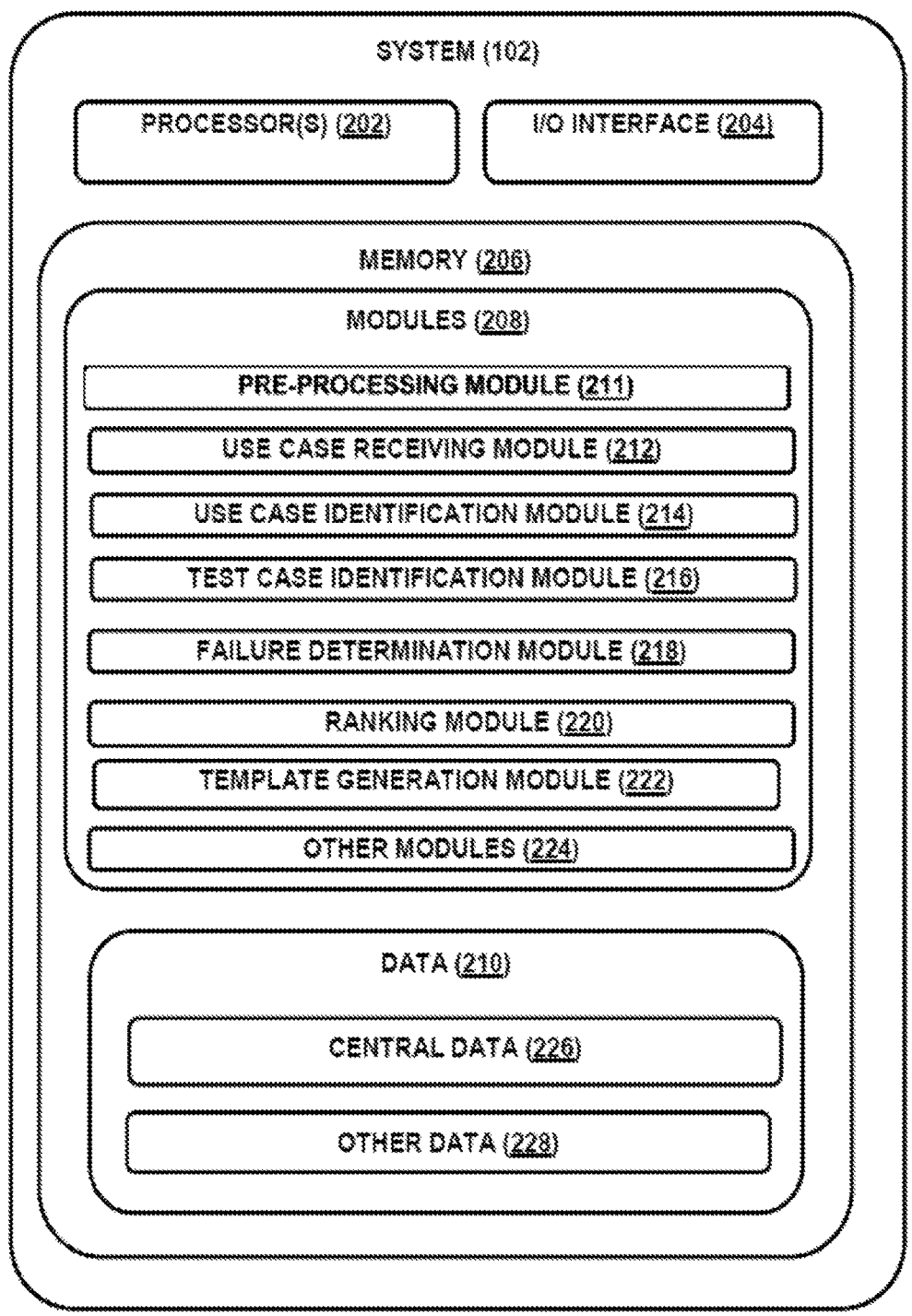
FIG. 2 illustrates the system for assisting the user in the application development lifecycle, in accordance with an embodiment of the present subject matter.

Referring now to FIG. 2, the system 102 for assisting a user in an application development lifecycle is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a pre-processing module 211, a use case receiving module 212, a use case identification module 214, a test case identification module 216, a failure determination module 218, a ranking module 220, a template generation module 222 and other modules 224. The other modules 224 may include programs or coded instructions that supplement applications and functions of the system 102.

The data 210, amongst other things, serve as a repository for storing data processed, received, and generated by one or more of the modules 208. The data 210 may also include a central data 226, and other data 228. In one embodiment, the other data 228 may include data generated as a result of the execution of one or more modules in the other module 224.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the pre-processing module 211/content processor may be configured to process the data received from the set of external data sources and store the processed data in the one or more data tables maintained in the historical data repository 108. The pre-processing module 211 may process the data, such as one or more use cases, one or more test cases, one or more failures, one or more resolutions and the like, received from the set of external data sources, and store the processed data in the one or more data tables of the historical data repository 108. The one or more data tables may correspond to use case data table, project management data table, test case data table, failure management data table, resolution document data table and the like. In one embodiment, the historical data repository 108 may be configured to store a set of use cases, a set of development solutions corresponding to each use case from the set of use cases, a set of test cases corresponding to each development solution and the like. Further, the historical data repository 108 may comprise a mapping of use cases from the use case data tables, failures from the failure management data tables, and resolutions from the resolution document data tables. In one example, the mapping may correspond to an existing Use Case-Risk-Resolutions (URR) mapping. Further, the content processor of the system 102 may be configured to generate a model based on the processing of the data received from external data sources. Furthermore, the map predictor may be configured to analyse the use cases and test cases to determine a predicted Use Case-Risk-Resolutions (URR) mapping. Further, the map predictor may process the model received from the content processor with respect to use cases and test cases, and the like. In one embodiment, the text mining algorithm may be used to determine the predicted URR mapping. Further, the map predictor may compare the predicted URR mapping with the existing URR mapping to update the one or more data tables of the historical data repository 108. Furthermore, the predicted URR mapping may correspond to URR mapping predicted by analyser and already exists in the historical data repository 108, URR mapping predicted by the analyser but not existing in the historical data repository 108, URR mapping exists in the historical data repository 108 but not predicted by the analyser, and the like. Further, the predicted URR mappings that already exists in the historical data repository 108 may be marked and stored in the one or more data tables of the historical data repository 108.

Upon processing the data from the external data sources, the use case receiving module 212/use case analyser may receive a new use case from the user device 104 based on the inputs provided by the user. The new use case may comprise a new use case name, a new use case description, pre-conditions associated with the new use case, post-conditions associated with the new use case and the like. Upon receiving the new use case, the use case receiving module 212 may store the new use case in the central data 226. In one embodiment, the new use case may correspond to a new functionality/feature to be incorporated in an application under development. For example, the new feature may correspond to creation of a login page, incorporating a search box in the application, or adding an API in the application under development.

The new use case description may correspond to a description, associated with the new feature, for example size of login button, location of the login button, security features of the login page and the like. The pre-conditions associated with the new use case may correspond to a set of conditions that may be required to be satisfied for an execution of the new feature in the application. The post-conditions may correspond to one or more output requirements associated with the execution of the new feature in the application.

In one exemplary embodiment, the user may be interested to incorporate a login button on the login page of the application under development. The use case name may be login button. The use case description may correspond to size of the login button, location of the login button and the like. In one example, the user may incorporate the login button on top of the login page, at bottom of the login page, and the like. The pre-conditions associated with the login button may correspond to a condition that the user may be able to click on the login button only after adding a login information to the login page. In one example, the login information may correspond to login ID, login password and the like. The post-condition associated with the login button may comprise displaying a main page of the application to the user, after clicking on the login button.

Upon receiving the new use case, the use case identification module 214 may identify one or more target use cases similar to the new use case based on the analysis of the one or more use cases, the one or more test cases, the one or more failures, the one or more resolutions and the like. Once the one or more target use cases identical to the new use case are identified, the use case identification module 214 may identify a sub-set of development solutions from a set of development solutions stored in the historical data repository 108. In one embodiment, the sub-set of development solutions may correspond to one or more target use cases from the historical data repository 108. The sub-set of development solutions may be associated with a set of applications historically analysed using the system 102 and may be applicable for developing the new feature. In one example, the sub-set of development solutions may correspond to one or more methods, associated with the set of applications, applicable for developing a feature that may be identical to the new feature.

Further to the identification of the sub-set of development solutions, the test case identification module 216/test case or test script processor may identify a set of test cases, associated with each development solutions from the sub-set of development solutions, from the historical data repository 108. The test case identification module 216 may identify the set of test cases using a text mining algorithm.

Once the set of test cases corresponding to each development solution from the sub-set of development solutions is identified, the failure determination module 218/failure categorization processor may determine one or more failures based on analysis of the set of test cases corresponding to each development solution.

Further, the failure determination module may fetch a set of resolutions, from the historical data repository 108, corresponding to the one or more failures. In one example, each resolution from the set of resolutions may correspond to a way of addressing the one or more failures. Further to determining the one or more failures and fetching the set of resolutions, the failure determination module 218 may categorize each failure from the one or more failures as a problem or a false failure. In one embodiment, the problem may correspond to a bug associated with the analysis of the set of test cases and the false failure may correspond to a failure of one or more test cases from the set of test cases. The failure determination module 218 may use text mining and machine learning algorithm for categorizing each failure from the one or more failures.

Furthermore, the failure determination module 218 may generate a problem report and a false failure report. The problem report may comprise one or more failures corresponding to the problem and one or more resolutions, from the set of resolutions, associated with the problem. The false failure report may comprise one or more failures corresponding to the false failure and one or more resolutions, from the set of resolutions, associated with the false failure. The problem report and the false failure report may be generated corresponding to each development solution from the sub-set of development solutions.

Once the problem report and the false failure report are generated, the ranking module 220/decision templates processor may rank the sub-set of development solutions based on analysing the problem report and the false failure report corresponding to the sub-set of development solutions. In one embodiment, the ranking of the sub-set of development solutions may further be based on probability of success in implementing each development solution. The probability of success may be determined based on the analysis of the problem report and the false failure report. In one embodiment, the ranking of the sub-set of development solutions may be based on feedback, associated with the sub-set of development solutions, received from one or more users in past. In one embodiment, the ranking module 220 may rank the sub-set of development solutions based on comparing number of failures associated with the problem report and number of failures associated with the false failure report. In one example, rank of one development solution, from the sub-set of development solutions, may be high, when number of failures in the false failure report is more than number of bugs determined in the problem report.

Further to the ranking of the sub-set of development solutions, the template generation module 222/decision templates processor may generate a decision template based on the ranking of the sub-set of development solutions. The decision template may correspond to mapping of the new use case with the sub-set of development solutions based on the problem report and the false failure report. In one embodiment, the decision template may be stored in a decision template library. The decision template library may comprise one or more decision templates for one or more use cases associated with different projects, domains and the like. In one example, the decision template library may be part of the central data 226.

In one embodiment, the decision template may be customizable. The template generation module 222 may enable the user to edit the decision template, already available in the decision template library. Upon editing the decision template, the template generation module 222 may store the decision template that may be edited by the user as a new decision template in the decision template library.

In another embodiment, the template generation module 222 may assist the user for incorporating feature, identical to the new feature, in any other application. The template generation module 222 may help the user to avoid frequent failures in incorporating the new features in the application by suggesting the decision template. The template generation module 222 may suggest a decision template from the decision template library to the user across the projects, domains and the like. Further, the method for assisting a user in an application development lifecycle is further elaborated with respect to the block diagram of FIG. 3.

Figure 3:
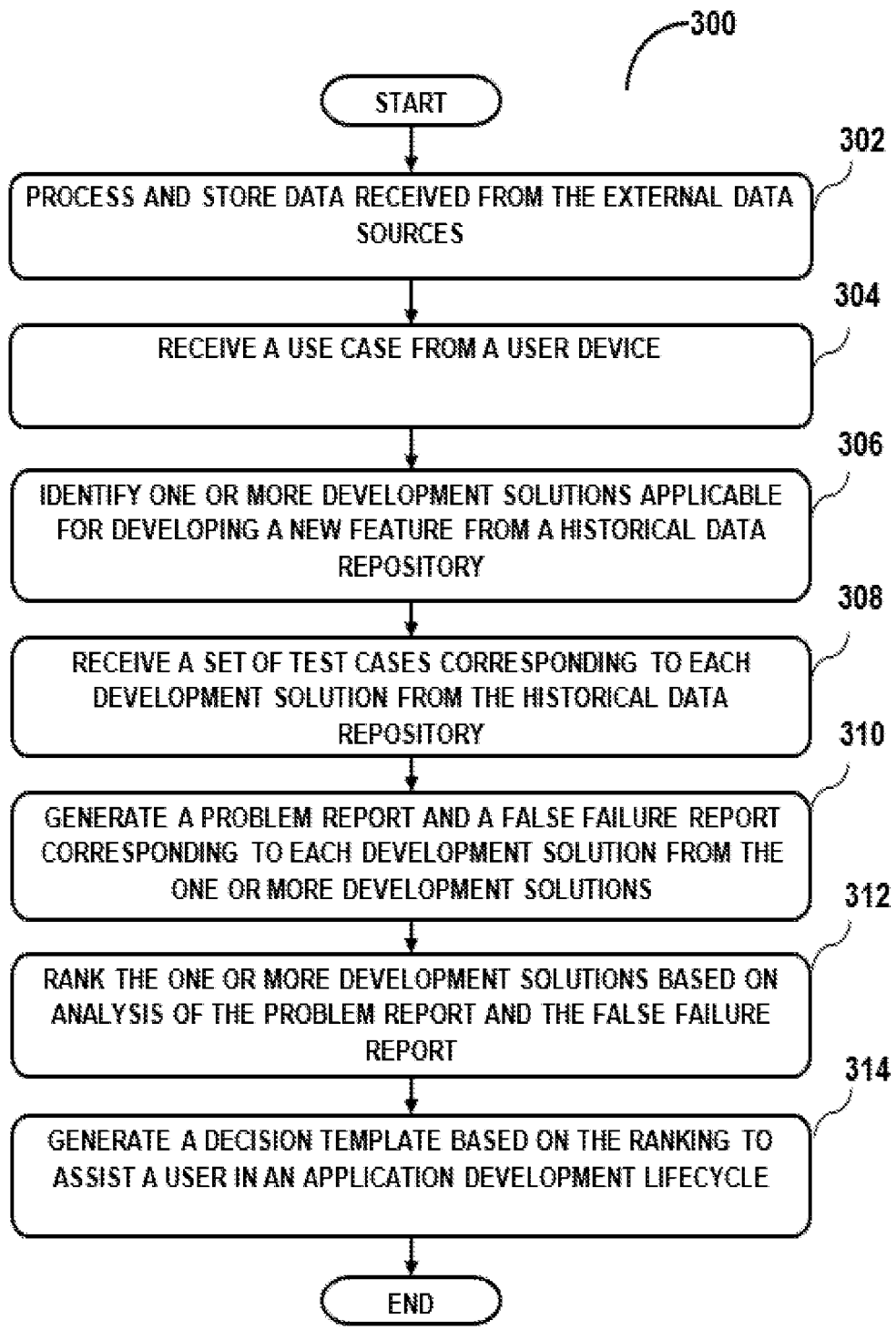
FIG. 3 illustrates a method for assisting a user in an application development lifecycle, in accordance with an embodiment of the present subject matter.

Referring now to FIG. 3, a method 300 for assisting a user in an application development lifecycle, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, data received from the set of external data sources may be processed. In one embodiment, the pre-processing module 211/content processor may be configured to process the data received from the set of external data sources and store the processed data in the one or more data tables maintained in the historical data repository 108. In one embodiment, the data may correspond to one or more use cases, one or more test cases, one or more failures, one or more resolutions and the like, received from the set of external data sources, and store the processed data in the one or more data tables of the historical data repository 108. The one or more data tables may correspond to use case data table, project management data table, test case data table, failure management data table, resolution document data table and the like. In one embodiment, the historical data repository 108 may be configured to store a set of use cases, a set of development solutions corresponding to each use case from the set of use cases, a set of test cases corresponding to each development solution and the like. Further, the historical data repository 108 may comprise a mapping of use cases from the use case data tables, failures from the failure management data tables, and resolutions from the resolution document data tables. In one example, the mapping may correspond to an existing Use Case-Risk-Resolutions (URR) mapping. Further, the content processor of the system 102 may be configured to generate a model based on the processing of the data received from external data sources. Furthermore, the map predictor may be configured to analyse the use cases and test cases to determine a predicted Use Case-Risk-Resolutions (URR) mapping. Further, the map predictor may process the model received from the content processor with respect to use cases and test cases, and the like. In one embodiment, the text mining algorithm may be used to determine the predicted URR mapping. Further, the map predictor may compare the predicted URR mapping with the existing URR mapping to update the one or more data tables of the historical data repository 108. Furthermore, the predicted URR mapping may correspond to URR mapping predicted by analyser and already exists in the historical data repository 108, URR mapping predicted by the analyser but not existing in the historical data repository 108, URR mapping exists in the historical data repository 108 but not predicted by the analyser, and the like. Further, the predicted URR mappings that already exists in the historical data repository 108 may be marked and stored in the one or more data tables of the historical data repository 108.

At block 304, a new use case may be received from the user device 104 based on the inputs provided by the user. In one embodiment, the use case receiving module 212/use case analyser may receive the new use case from the user device 104 based on the inputs provided by the user. The new use case may comprise a new use case name, a new use case description, pre-conditions associated with the new use case, post-conditions associated with the new use case and the like. Upon receiving the new use case, the new use case may be stored in the central data 226. In one embodiment, the new use case may correspond to a new functionality/feature to be incorporated in an application under development. For example, the new feature may correspond to creation of a login page, incorporating a search box in the application, or adding an API in the application under development.

The new use case description may correspond to a description, associated with the new feature, for example size of login button, location of the login button, security features of the login page and the like. The pre-conditions associated with the new use case may correspond to a set of conditions that may be required to be satisfied for an execution of the new feature in the application. The post-conditions may correspond to one or more output requirements associated with the execution of the new feature in the application.

In one exemplary embodiment, the user may be interested to incorporate a login button on the login page of the application under development. The use case name may be login button. The use case description may correspond to size of the login button, location of the login button and the like. In one example, the user may incorporate the login button on top of the login page, at bottom of the login page, and the like. The pre-conditions associated with the login button may correspond to a condition that the user may be able to click on the login button only after adding a login information to the login page. In one example, the login information may correspond to login ID, login password and the like. The post-condition associated with the login button may comprise displaying a main page of the application to the user, after clicking on the login button.

At block 306, one or more target use cases similar to the new use case may be identified based on the analysis of the one or more use cases, the one or more test cases, the one or more failures, the one or more resolutions and the like. In one embodiment, the use case identification module 214 may identify the one or more target use cases similar to the new use case. Once the one or more target use cases identical to the new use case are identified, a sub-set of development solutions from a set of development solutions stored in the historical data repository 108 may be identified. In one embodiment, the sub-set of development solutions may correspond to one or more target use cases from the historical data repository 108. The sub-set of development solutions may be associated with a set of applications historically analysed using the system 102 and may be applicable for developing the new feature. In one example, the sub-set of development solutions may correspond to one or more methods, associated with the set of applications, applicable for developing a feature that may be identical to the new feature.

At block 308, a set of test cases associated with each development solution from the sub-set of development solutions may be identified from the historical data repository 108. In another embodiment, the test case identification module 216/test case or test script processor may identify the set of test cases. In one embodiment, the set of test cases may be identified using a text mining algorithm.

At block 310, one or more failures may be determined based on analysis of the set of test cases. In one embodiment, the failure determination module 218/failure categorization processor may determine the one or more failures. Further, a set of resolutions, corresponding to the one or more failures, may be fetched from the historical data repository 108. In one example, each resolution from the set of resolutions may correspond to a way of addressing the one or more failures. Further to determining the one or more failures and fetching the set of resolutions, each failure from the one or more failures may be categorized as a problem or a false failure. In one embodiment, the problem may correspond to a bug associated with the analysis of the set of test cases and the false failure may correspond to a failure of one or more test cases from the set of test cases. In one embodiment, text mining and machine learning algorithm may be used for categorizing each failure from the one or more failures.

At block 310, a problem report and a false failure report may be further generated. The problem report may comprise one or more failures corresponding to the problem and one or more resolutions, from the set of resolutions, associated with the problem. The false failure report may comprise one or more failures corresponding to the false failure and one or more resolutions, from the set of resolutions, associated with the false failure. The problem report and the false failure report may be generated corresponding to each development solution from the sub-set of development solutions.

At block 312, ranking may be provided to the sub-set of development solutions based on analysis of the problem report and the false failure report corresponding to the sub-set of development solutions. In one embodiment, the ranking module 220/decision templates processor may rank the sub-set of development solutions. In one embodiment, the ranking of the sub-set of development solutions may further be based on probability of success in implementing each development solution. The probability of success may be determined based on the analysis of the problem report and the false failure report. In one embodiment, the ranking of the sub-set of development solutions may be based on feedback, associated with the sub-set of development solutions, received from one or more users in past. In one embodiment, the ranking of the sub-set of development solutions may be based on comparison of number of failures associated with the problem report and number of failures associated with the false failure report. In one example, rank of one development solution, from the sub-set of development solutions, may be high, when number of failures in the false failure report is more than number of bugs determined in the problem report.

At block 314, a decision template may be generated based on the ranking of the sub-set of development solutions. In one embodiment, the template generation module 222/decision templates processor may generate the decision. The decision template may correspond to mapping of the new use case with the sub-set of development solutions based on the problem report and the false failure report. In one embodiment, the decision template may be stored in a decision template library. The decision template library may comprise one or more decision templates for one or more use cases associated with different projects, domains and the like. In one example, the decision template library may be part of the central data 226.

In one embodiment, the decision template may be customizable. The user may be able to edit the decision template, already available in the decision template library. Upon editing the decision template, the edited decision template may be stored as a new decision template in the decision template library. In another embodiment, the user may use the decision template for incorporating feature, identical to the new feature, in any other application.

Although implementations for systems and methods for assisting a user in an application development lifecycle have been described, it is to be understood that the appended claims are not necessarily limited to the specific features or methods described. Rather, the specific features and methods are disclosed as examples of implementations for assisting the user in the application development lifecycle.

We claim:

1. A method for assisting a user in an application development lifecycle, the method comprising:
receiving, by a processor, a new use case from a user device, wherein the new use case corresponds to a new feature to be incorporated in an application under development;
identifying, by the processor, a sub-set of development solutions applicable for developing the new feature from a set of development solutions stored in a historical data repository, the set of development solutions corresponding to each of the use case from the set of use cases also stored in the historical data repository, wherein the sub-set of development solutions is associated with a set of applications;
identifying, by the processor, a set of test cases corresponding to each development solution, of sub-set of development solutions, from the historical data repository;
generating, by the processor, a problem report and a false failure report corresponding to each development solution from the sub-set of development solutions based on analysis of the set of test cases corresponding to each development solution;
ranking, by the processor, the sub-set of development solutions based on analysis of the problem report and the false failure report corresponding to each development solution from the sub-set of development solutions; and
generating, by the processor, a decision template based on the ranking to assist a user in an application development lifecycle of the application.

2. The method of claim 1, wherein the historical data repository is configured to store a set of use cases, the set of development solutions corresponding to each use case from the set of use cases, and the set of test cases corresponding to each development solution.

3. The method of claim 1, wherein the sub-set of development solutions correspond to one or more target use cases, wherein the one or more target use cases are similar to the new use case.

4. The method of claim 1, wherein the problem report and the false failure report are generated using a text mining and machine learning algorithm.

5. The method of claim 1, wherein the decision template corresponds to mapping of the new use case with the sub-set of development solutions based on the problem report, the false failure report.

6. A system for assisting a user in an application development lifecycle, the system comprising:
a memory; and
a processor coupled to the memory, wherein the processor is configured to execute programmed instructions stored in the memory to:
receive a new use case from a user device, wherein the new use case corresponds to a new feature to be incorporated in an application under development;
identify a sub-set of development solutions applicable for developing the new feature from a set of development solutions stored in a historical data repository, the set of development solutions corresponding to each of the use case from the set of use cases also stored in the historical data repository, wherein the sub-set of development solutions is associated with a set of applications;
identify a set of test cases corresponding to each development solution, of sub-set of development solutions, from the historical data repository;
generate a problem report and a false failure report corresponding to each development solution from the sub-set of development solutions based on analysis of the set of test cases corresponding to each development solution;
rank the sub-set of development solutions based on analysis of the problem report and the false failure report corresponding to each development solution from the sub-set of development solutions; and
generate a decision template based on the ranking to assist a user in an application development lifecycle of the application.

7. The system of claim 6, wherein the historical data repository is configured to store a set of use cases, the set of development solutions corresponding to each use case from the set of use cases, and the set of test cases corresponding to each development solution.

8. The system of claim 6, wherein the sub-set of development solutions correspond to one or more target use cases, wherein the one or more target use cases are similar to the new use case.

9. The system of claim 6, wherein the problem report and the false failure report are generated using a text mining and machine learning algorithm.

10. The system of claim 6, wherein the decision template corresponds to mapping of the new use case with the sub-set of development solutions based on the problem report, the false failure report.

11. A computer program product having embodied thereon a computer program for assisting a user in an application development lifecycle, the computer program product comprising:
a program code for receiving a new use case from a user device, wherein the new use case corresponds to a new feature to be incorporated in an application under development;
a program code for identifying a sub-set of development solutions applicable for developing the new feature from a set of development solutions stored in a historical data repository, the set of development solutions corresponding to each of the use case from the set of use cases also stored in the historical data repository, wherein the sub-set of development solutions is associated with a set of applications;

a program code for identifying a set of test cases corresponding to each development solution, of sub-set of development solutions, from the historical data repository;

a program code for generating a problem report and a false failure report corresponding to each development solution from the sub-set of development solutions based on analysis of the set of test cases corresponding to each development solution;

a program code for ranking the sub-set of development solutions based on analysis of the problem report and the false failure report corresponding to each development solution from the sub-set of development solutions; and a program code for generating a decision template based on the ranking to assist a user in an application development lifecycle of the application.

* * * * *